US008239648B2

(12) United States Patent
Goebel et al.

(10) Patent No.: US 8,239,648 B2
(45) Date of Patent: Aug. 7, 2012

(54) RECLAMATION OF THIN PROVISIONED DISK STORAGE

(75) Inventors: David A. Goebel, Vashon, WA (US);
James M. Lyon, Redmond, WA (US);
Bulat Shelepov, Bellevue, WA (US);
Robert S. Kleinschmidt, Redmond, WA (US); Mark Vayman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 415 days.

(21) Appl. No.: 12/422,327

(22) Filed: Apr. 13, 2009

(65) Prior Publication Data

US 2010/0262802 A1 Oct. 14, 2010

(51) Int. Cl.
*G06F 13/00* (2006.01)

(52) U.S. Cl. .......................... 711/166; 711/170; 711/162

(58) Field of Classification Search .................. 711/166, 711/170, 162, 163, 103, 147, 154, 115, 112, 711/165
See application file for complete search history.

(56) References Cited

U.S. PATENT DOCUMENTS

| 2006/0041595 A1* | 2/2006 | Taguchi et al. ............... 707/200 |
| 2007/0079100 A1* | 4/2007 | Shiga et al. .................... 711/170 |
| 2009/0228889 A1* | 9/2009 | Yoshida ....................... 718/102 |
| 2010/0070731 A1* | 3/2010 | Mizuno et al. ................. 711/170 |

* cited by examiner

*Primary Examiner* — Dang Nguyen
(74) *Attorney, Agent, or Firm* — Russell S. Krajec; Krajec Patent Offices, LLC

(57) ABSTRACT

A thin provisioned storage system may have a file system manager that presents a logical storage system to a user and a storage management system that manages physical storage devices. When a block of data is freed at the logical layer, the file system manager may identify the freed block and send a command to the physical layer. The physical layer may identify the corresponding physical block or blocks and free those blocks on the physical layer. The storage management system may use a table to manage the location of blocks of data across multiple physical storage devices.

20 Claims, 4 Drawing Sheets

RECLAMATION OF THIN PROVISIONED DISK STORAGE

BACKGROUND

Thin provisioning is a technique by which logical resources may be drawn from physical resources, and in which the logical resources may not be limited to the capacity of the physical resources. In storage technologies, a thin provisioned system may have several logical volumes that are stored on a storage system having a fixed capacity. Each volume may present itself as having the full amount of the storage system available, and the physical storage may be allocated to one of the volumes as requested by the volume.

SUMMARY

A thin provisioned storage system may have a file system manager that presents a logical storage system to a user and a storage management system that manages physical storage devices. When a block of data is freed at the logical layer, the file system manager may identify the freed block and send a command to the physical layer. The physical layer may identify the corresponding physical block or blocks and free those blocks on the physical layer. The storage management system may use a table to manage the location of blocks of data across multiple physical storage devices.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
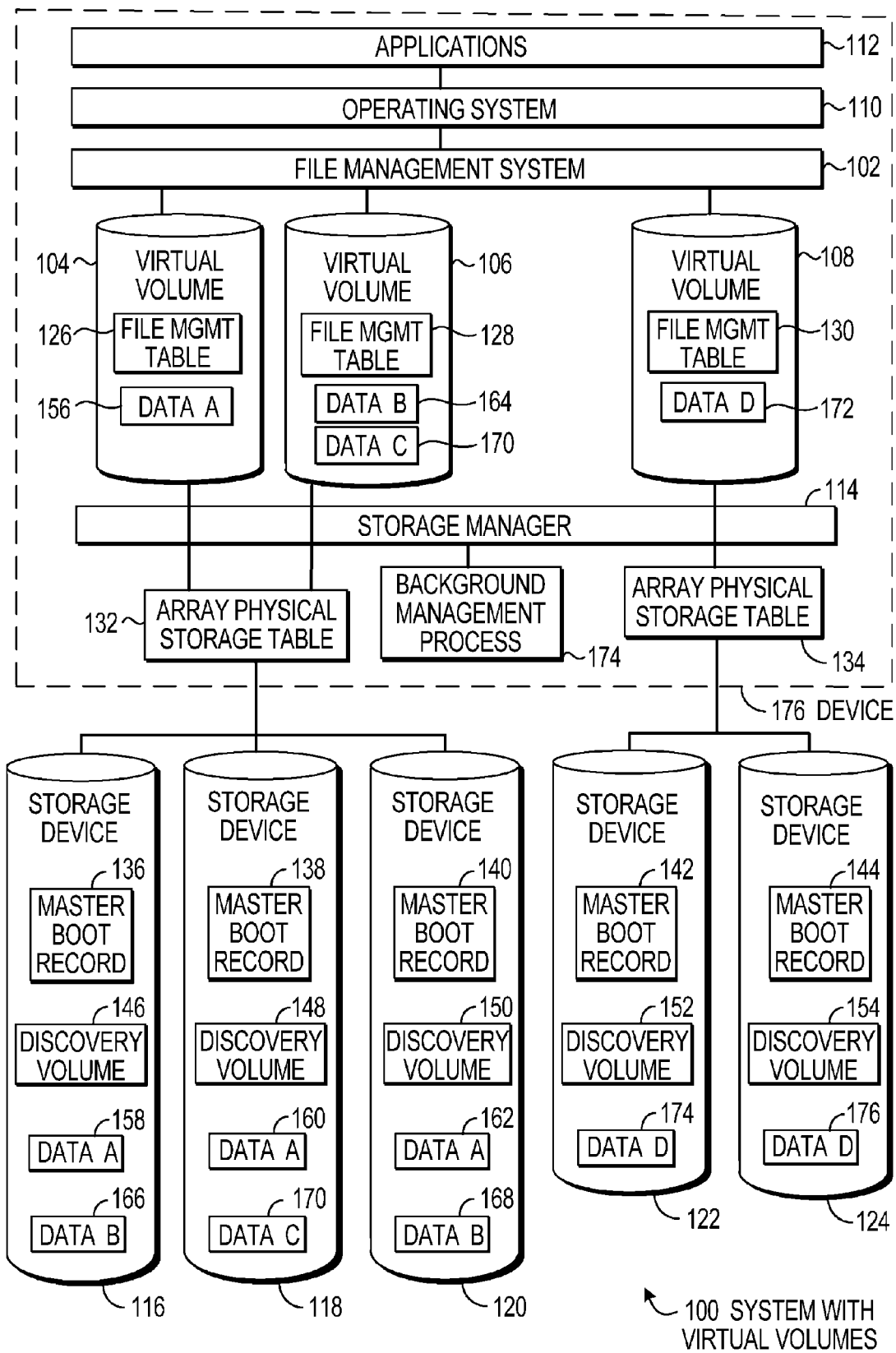
FIG. 1 is a diagram illustration of an embodiment showing a system with virtual volumes.

A data storage system may manage multiple thinly provisioned virtual volumes on a storage array with one or more storage devices. A file management system may present the virtual volumes to an operating system and applications, and may communicate with a storage manager to store, retrieve, or delete files on an array of storage devices.

The file management system may maintain a file management table that contains entries for storage space and the data contained in the space. The file management table may reference virtual blocks of data using an address scheme. When an operation is to be performed on the physical storage array, the file management system may update the file management table with the change, and transmit the virtual address of the change along with any data to be stored. The storage manager may look up the virtual address in a physical storage table for the array and identify the physical block or blocks represented by the virtual address. The storage manager may perform the operation on the physical blocks.

When a file deletion occurs, the file management system may perform the deletion in two steps. First, the file management system may update the file management table to reflect that the space occupied by the file is free. Secondly, the file management system may transmit the address of the deleted file to the storage manager. The storage manager may perform a physical deletion by updating the physical storage table to reflect that the space occupied by the file is now free. In some cases, the storage manager may perform an overwrite operation to erase the previously stored data.

In many embodiments, the storage manager may manage an array of storage devices on which are stored one or more thinly provisioned virtual volumes. Several virtual volumes may share the same storage array, and a storage manager may be capable of creating and managing two or more separate storage arrays.

The data storage system may have two distinct component parts: a file management system that may operate using logical volumes and a storage manager that may operate using physical storage devices. The separation of the two components may allow a storage management system to present itself as a single storage mechanism to a generic file management system. The file management system may have a standardized interface for interacting with physical storage devices, and the storage management system may use such an interface without modification in some cases.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, resources, data structures, etc. that perform particular tasks or implement particular abstract data types. Typically, the functionality of the program modules may be combined or distributed as desired in various embodiments.

FIG. 1 is a diagram of an embodiment 100 showing a system for storing data using virtual volumes. Embodiment 100 is a simplified example of a stack of functional components that may present several thinly provisioned virtual volumes and store the virtual volumes on arrays of storage devices.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 illustrates the functional components of a system that may be implemented in any hardware arrangement that has multiple storage devices. The storage devices may be the same capacity and may use the same type of connection interface. The storage devices may, in some embodiments, have different storage capacities and may use different connection interfaces. In some embodiments, two storage devices may be managed, while in other embodiments tens, hundreds, or more storage devices may be managed.

Embodiment 100 illustrates a storage system that may be implemented in a single computer device to manage several storage devices connected to the computer. In a typical embodiment, a server computer or desktop computer may provide the functions of embodiment 100. Some embodiments may be deployed in any type of device that may have one or more storage devices. The storage devices may be the same type of physical storage device or may be different. In one example, a handheld cellular telephone may contain an internal solid state memory device and a removable memory device, on which the functionality of embodiment 100 may be deployed.

The example of embodiment 100 may be operated on a device 176. The device 176 may be a hardware platform having a processor that may be execute instructions in the form of software. The software may define the functional components, data structures, and other elements of embodiment 100.

A file management system 102 may make several virtual volumes available. Embodiment 100 illustrates virtual volumes 104, 106, and 108. The file management system 102 may be a component of an operation system 110 or a separate functional component. Various applications 112 may transmit file commands through the operating system 110 to the file management system 102.

The file commands may be various commands that may create and delete files, read and write to files, and perform other operations such as renaming files, creating and manipulating directory structures, and placing files within the directory structure.

The virtual volumes 104, 106, and 108 may be thinly provisioned storage volumes. Virtual volumes 104 and 106 are illustrated as being stored on one physical array of storage devices and may share the storage capacity of the storage array of devices 116, 118, and 120. Virtual volume 108 is illustrated as being stored on a storage array having storage devices 122 and 124.

A virtual volume may be presented to an operating system 110 as a single storage device, as if the virtual volume were, for example, a hard disk drive or other storage device. A storage array may aggregate the available storage of several devices and may expose the virtual volume as if the virtual volume had the capacity of all of the available storage on the storage array.

In one usage scenario, the virtual volumes 104 and 106 may be created with the storage array of storage devices 116, 118, and 120 as the physical storage system. When no data are stored in the virtual volumes 104 and 106, most of the storage capacity of the storage array may be available to either virtual volume 104 or 106. In some cases, some storage capacity may be used for overhead uses. A query to either virtual volume 104 or 106 may result in both volumes having the free capacity of the sum of all the storage devices 116, 118, and 120. As data are stored on one virtual volume, the storage manager 114 may store data on the various storage devices 116, 118, and 120, consuming the storage available and leaving less physical storage for the other virtual volume.

In the usage scenario, the virtual volumes are thinly provisioned. When created, both volumes advertise that they have the full capacity of the storage array, but the capacity of the storage array can be split between the volumes.

In another usage scenario, a virtual volume may be created that is many times larger than the underlying storage array, sometimes 2, 3, or 100 or more times larger. The system may be configured to enable additional storage devices to be added to or removed from the storage array as the storage is consumed. For example, as the virtual volume fills the physical devices in the storage array, the storage manager 114 may alert an administrator who may add one or more storage devices to the array.

Some embodiments may create virtual volumes that are many times larger than could be foreseen to be used by a system. By having very large virtual volumes, a system may not run into a situation where the volume becomes filled, and the physical storage may be added or removed over the life of the system.

The file management system 102 may manage the data stored in the virtual volume through a file management table. For example, file management tables 126, 128, and 130 that correspond to the virtual volumes 104, 106, and 108.

A file management table may include the location of specific files within the file system in the virtual volume. A file management table may include many different forms of metadata concerning a file. The metadata may include information such as security settings, file type, file owner, file size, file extents, and other metadata. In some embodiments, a file management table may include a bitmap or other representation of blocks of data that are either free or occupied. In some embodiments, the extents may be used as a mapping between the virtual volumes and the physical volumes.

In this specification and claims, the term "block" is used to represent a generic unit of storage space, and may or may not correspond with a particular physical feature or capacity of a specific physical storage device. The term "block" is used only in the generic sense as a unit of storage and is not meant to be limiting in any manner. In some embodiments, the unit represented by a block may be a sector of 512 bytes, a cluster containing one or more sectors, or some other unit of storage. Different embodiments may manage storage using various sized units of storage. In cases where many small files are managed, a smaller sized block of storage may be used. In cases where very large files are managed, a larger sized block of storage may be used. In a large file system that may be used on a server computer, a block may represent a gigabyte of information.

The term "file management table" is used to describe a metadata system or database that may be used to manage a file system. In a simple embodiment, a file management table may be a table or array of files located in a volume along with the starting location of the file within the volume. In more complex embodiments, the file management table may be a relational database or other data storage mechanism that may comprise several tables or other mechanism for storing data concerning the file system. Some file management tables may include a bitmap that represent the storage blocks within a volume, where the bits within bitmap may represent whether or not a block is used or free.

The file management tables 126, 128, and 130 may contain the metadata describing the respective virtual volumes. Some or all of the file management tables may be stored in random access memory to decrease response time, and may also be synchronized with copies on physical storage devices.

When a command is received to remove a file from a virtual volume, the file management system 102 may perform two steps. In the first step, the file management system 102 may update the file management table to reflect the fact that the deleted file is no longer found in the file system. In the second step, the file management system 102 may send a notification to the storage manager 114. The storage manager 114 may update an array physical storage table 132 or 134, and optionally may perform an actual removal of the data from the physical storage devices.

The array physical storage table 132 or 134 may cross reference a virtual block of storage with one or more physical blocks of storage. In some cases, a storage manager 114 may place multiple copies of a block of storage at different locations within a storage array. For example, some data may be stored on each physical storage device within an array. In another example, some data may be placed on two physical storage devices for redundancy.

A storage manager 114 may track the physical location of a block of data using an array physical storage table 132 or 134. Each storage array may have a physical storage table which may be used to translate between a virtual block address as defined in a file management table for a virtual volume and the physical address of the block of data on one or more physical storage devices.

The physical storage table may be any type of database that may be used to manage the physical devices. The physical storage table may contain, among other things, addresses for physical blocks of data that represent the virtual blocks of data managed by the file management system 102 and stored in a file management table. The physical storage table may be represented as a table, an array, a relational database, a log file, or any other database construct.

In many embodiments, the storage manager 114 may have policies that are applied to different types of data. The policies may define how a certain set of data may be stored within the array, such as whether or not the set of data is to be duplicated on two or more storage devices. Duplicated storage may consume more storage from the array, but may be more fault tolerant if one of the devices is removed from the array or suffers a hardware failure. The policies may be applied based on metadata concerning the data to be stored. In some cases, the metadata may be transmitted from the file management system 102 to the storage manager 114. In other cases, the metadata may be derived from analyzing the data.

The array physical storage tables 132 and 134 may be used to identify free blocks within the storage array. A file management system 102 may send a command requesting additional storage space to a storage manager 114. An example of such a command may be a command that writes data to the file. The command may request physical storage space from a storage manager 114. The storage manager 114 may query the array physical storage table to identify an empty block and store the data in the empty block.

Some commands may cause the storage manager 114 to reserve one or more blocks for a future use. One example of such a use may be when a file is copied to a location, a command may reserve enough space to hold an incoming file. When the file data are received, the file data may be stored in the reserved location.

In order to keep the physical storage tables up to date, the file management system 102 may send a message to the storage manager 114 when a block of data is no longer used. The message may cause the storage manager 114 to free the block for future allocation to another request for data.

The message sent from the file management system 102 to the storage manager 114 when a block is freed may allow a different virtual volume to use the space.

In embodiment 100, the storage devices 116, 118, and 120 may be a storage array on which two virtual volumes 104 and 106 are stored. Because the virtual volumes 104 and 106 are thinly provisioned, either volume may use the physical space within the storage array. As files are added to a virtual volume, the other virtual volume may have less potential space to use. Conversely, as files are removed from one virtual volume and the space is marked as free within the array physical storage table 132, the other virtual volume may then use the space or the same volume may reuse the space.

In some embodiments, a delay may occur between when a file management system 102 processes a delete command by updating a file management table and when the deletion message may be transmitted to the storage manager 114 and processed by the storage manager 114. During the delay, the storage manager 114 may show less physical storage available than after the processing of the delete command.

When the storage manager 114 receives a message indicating that space is to be freed on the storage array, the storage manager 114 may update the array physical storage table and may cause the space on the storage devices to be overwritten. In some embodiments, a background management process 174 may perform the overwriting process as a low priority background operation.

In many embodiments, the space allocated and managed by the array physical storage table may be blocks of data that may correspond with blocks of data that are managed within the file management table. In some embodiments, the blocks of data may not correspond with individual files. In some cases, several files may be stored within a single block, and in other cases a single file may span several blocks.

In such embodiments, the file management system 102 may identify a block of data and may manage the files and data within the block. The file management system 102 may send a read or write command to the storage manager 114, and the command may reference the block and a location within the block for the read or write command. The storage manager 114 may process the command by performing the read or write action with a corresponding physical block. In such embodiments, the storage manager 114 may not have visibility into the type of data or the file structure that is stored in the blocks. The storage manager 114 may merely read and write to physical blocks, the address of which may be determined from the physical storage table using a virtual address from the file management system 102.

In such an embodiment, the file management system 102 may issue a free space command for an entire virtual block when that block is completely empty. If a file is deleted from a block, but a small file remains in the block, the block may not be identified for deletion by the storage manager 114.

The storage devices 116, 118, 120, 122, and 124 may be any type of storage device. In many instances, the storage devices may be hard disk drives. Some embodiments may manage hard disk drives that have different interfaces. For example, some embodiments may have one or more hard disk drives attached using SCSI, SATA, SAS, IDE, iSCSI, any form of network attached storage, or other industry standard interfaces. Such interfaces may be used when a hard disk drive is mounted internally to a system. Some embodiments may also include hard disk systems that are attached using USB, external SCSI, or other interfaces that may be external to a device.

Some embodiments may be capable of managing hard disk drives and other devices that have different interfaces within a single array. For example, a system may have two hard disk drives that use a SATA interface, one hard disk drive that uses an IDE interface, and two additional hard disk drives connected using USB.

The storage devices 116, 118, 120, 122, and 124 may be solid state devices, such as flash memory or other Electronically Erasable Programmable Read Only Memory (EEPROM) devices.

In some cases, the storage devices may include storage systems that have removable media, such as USB flash memory devices, read/write optical media, or other media.

Storage devices 116, 118, 120, 122, and 124 are illustrated with master boot records 136, 138, 140, 142, and 144, respectively. The master boot record or GUID Partition Table may be data that are stored in a specific place in a storage device, typically the first sector of a storage device, and may contain bootstrap commands that may enable a processor to start operation. In many embodiments, a storage device with a master boot record may be used to start up a system.

Some embodiments may not include a master boot record on a storage device, or may include a master boot record that is not bootable by a processor.

When a master boot record is created in a storage array, the master boot record may be different for different types of storage devices. For example, a storage array may be configured with a master boot record for an IDE connected hard disk may enable bootstrap operations for a processor, while a master boot record for a USB connected flash memory device may have a master boot record that is not bootable or may not have a master boot record at all.

Whether a master boot record is present or not, some devices may have a discovery volume 146, 148, 150, 152, and 154. Some devices may not have a discovery volume.

A discovery volume may contain information that may allow an operating system to mount the storage device and access the data stored in the storage device. Some embodiments of the discovery volume may include software that may be executed by a processor to perform the operations of the storage manager 114 that may communicate with a file management system 102 embedded into the operating system 110. The discovery volume may include drivers or other resources that may be used to access the data stored on the storage device. In some cases, the resources may be drivers or other resources that may be accessed from location defined by a Uniform Resource Locator or other address mechanism. The URL or address mechanism may be stored in the discovery volume.

The discovery volume for different storage devices may be differently configured. Devices using an IDE or SCSI interface may have a differently configured discovery volume that includes drivers configured for the specific interface for the device on which the discovery volume is located. In some embodiments, the discovery volume may be the same between different types of devices and may include drivers, software, or other resources for many different types of devices.

The storage manager 114 may store data within a storage array according to a policy defined for the data or according to direction from a file management system 102. For example, Data A 156 in the virtual volume 104 may be stored in each physical storage device 116, 118, and 120 as blocks 158, 160, and 162. Data B 164 in the virtual volume 106 may be stored in two physical storage devices 116 and 120 as blocks 166 and 168. Data C 170 in virtual volume 106 may be stored on one physical storage device 118 as block 170. Data D 172 in virtual volume 108 may be duplicated in physical storage devices 122 and 124 as blocks 174 and 176.

In the examples of Data A 156, Data B 164 and Data C 170, each set of data may be handled differently and data from different virtual volumes may be stored on the same physical storage devices. Data A 156 may be stored on three different physical storage devices, while Data B 164 may be stored on two devices, and Data C 170 may be stored on a single storage devices.

In some embodiments, the policies applied to a set of data may be based on the type of data or its location within the file system. For example, data that is a certain file type may be stored in blocks that are duplicated on two storage devices for redundancy. In some embodiments, the data type may be determined by metadata associated with the file or by analyzing the contents of the file. In another example, files that are within a specific subdirectory may be duplicated regardless of the contents of the file or the file type.

In some embodiments, a virtual volume may be configured to have all contents duplicated. For example, virtual volume 108 may be configured so that all data stored in the virtual volume is duplicated to at least two physical storage devices. In the example of virtual volume 104, all data within the virtual volume may be stored on three physical devices where the physical devices are shared with another virtual volume 106 having other policies defined for its data.

Figure 2:
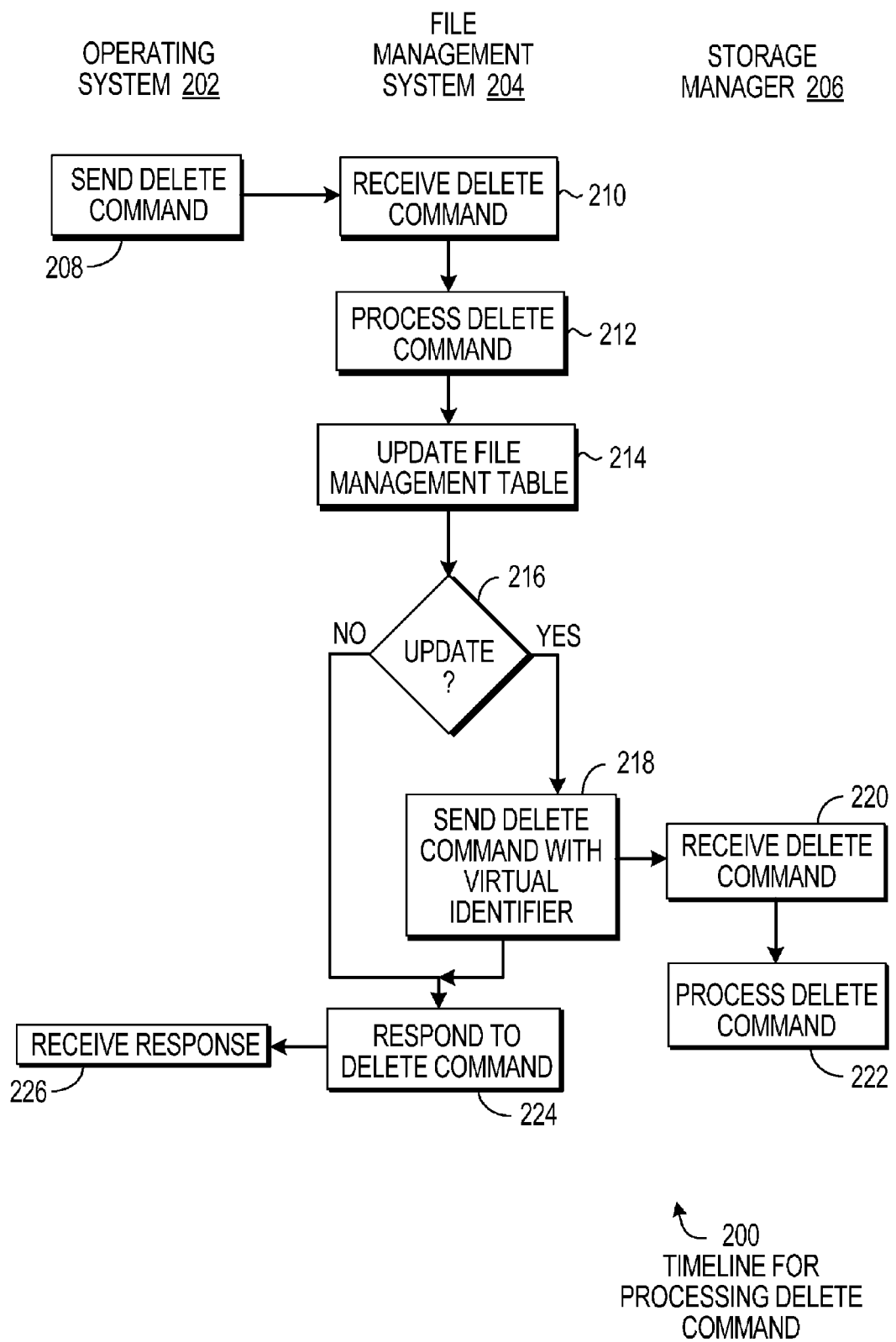
FIG. 2 is a timeline illustration of an embodiment showing a method for processing a delete command.

FIG. 2 is a timeline illustration of an embodiment 200 showing the interaction between an operating system 202, a file management system 204, and a storage manager 206. Embodiment 200 is a simplified example of the exchanges that may occur between the separate functional components while processing a delete command.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 200 illustrates a delete command that may be processed by a storage array such as the storage array of embodiment 100. Embodiment 200 illustrates a command that may be processed for a particular virtual volume.

The operations of an operating system 202 are illustrated in the left hand column. The operations of a file management system 204 are illustrated in the center column, and the operations of the storage manager 206 are illustrated in the right hand column.

The operating system 202 may send a delete command in block 208 to the file management system 204, which receives the delete command in block 210.

The file management system 204 may process the delete command in block 212, and may update the file management table in block 214. If an update to the storage manager 206 is to be performed in block 216, a delete command may be sent in block 218 with the identifier for a virtual block. Whether the storage manager 206 is updated in block 218 or not in block 216, a response may be sent by the file management system in block 224 and received by the operating system 202 in block 226.

In some cases, a file management system 204 may not send a delete command in block 216. For example, if a delete command causes a portion of a block to be erased but not the entire block, the file management system 204 may update the file management table in block 214 but may not send a command in block 218 that could cause the entire block of data to be deleted.

The storage manager 206 may receive a delete command in block 220 and process the delete command in block 222. An example of the processes of blocks 220 and 222 are illustrated in embodiment 300.

Figure 3:
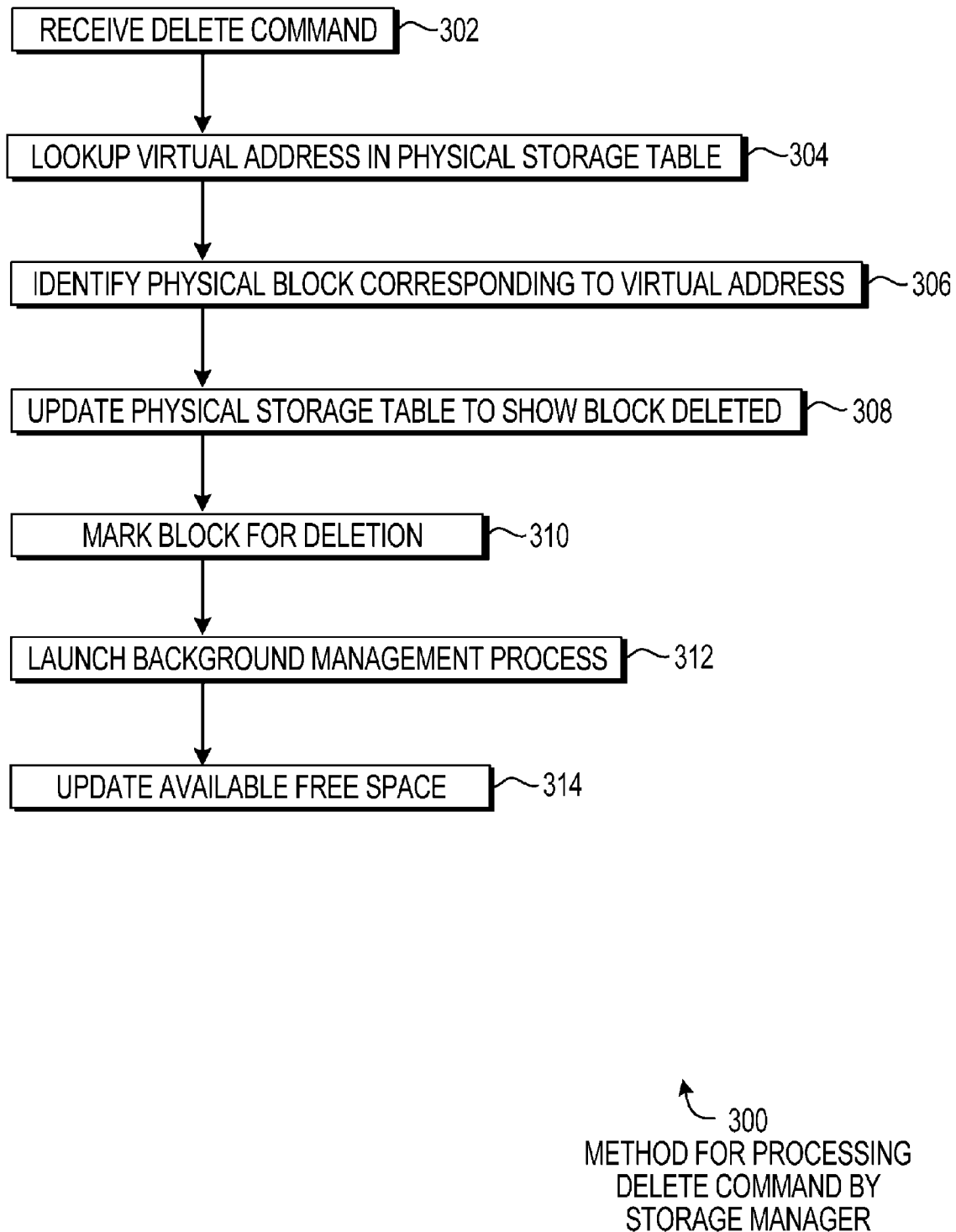
FIG. 3 is a flowchart illustration of an embodiment showing a method for processing a delete command by a storage manager.

FIG. 3 is a flowchart illustration of an embodiment 300 showing a method for processing a delete command as may be performed by a storage manager, such as storage manager 114. Embodiment 300 is a simplified example of a method that may be performed when a delete command is sent to a storage manager.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 is an example of a process that may be performed by a storage manager in response to a delete command. The storage manager may perform other functions, such as storing and retrieving data from an array of physical storage devices.

The storage manager may receive a delete command in block 302. Each embodiment may have a different term for the delete command. In a generic sense, the delete command may be a command to free space within the virtual volume. The free space command may contain a virtual address for the space to be freed.

In block 304, the virtual address may be looked up in a physical storage table to identify a physical address corresponding to the virtual address in block 306.

The storage manager may update a physical storage table in block 308 to reflect that the physical block or blocks are deleted, and may mark the blocks in block 310.

In many cases, a block of data may be duplicated or copied in multiple locations. The duplicate block may be located on a different physical storage device from the first block. In some embodiments, a duplicate block may be located on the same physical storage device.

A background process may be launched in block 312 that may perform the physical deletion of the blocks. An example of the operations of a background process is illustrated in embodiment 400 presented later in this specification.

In block 314, the storage manager may update the available free space to a file management system to reflect that the deleted space is free. In many embodiments, the available free space may not be updated until the background process of block 312 has completed its operation.

Figure 4:
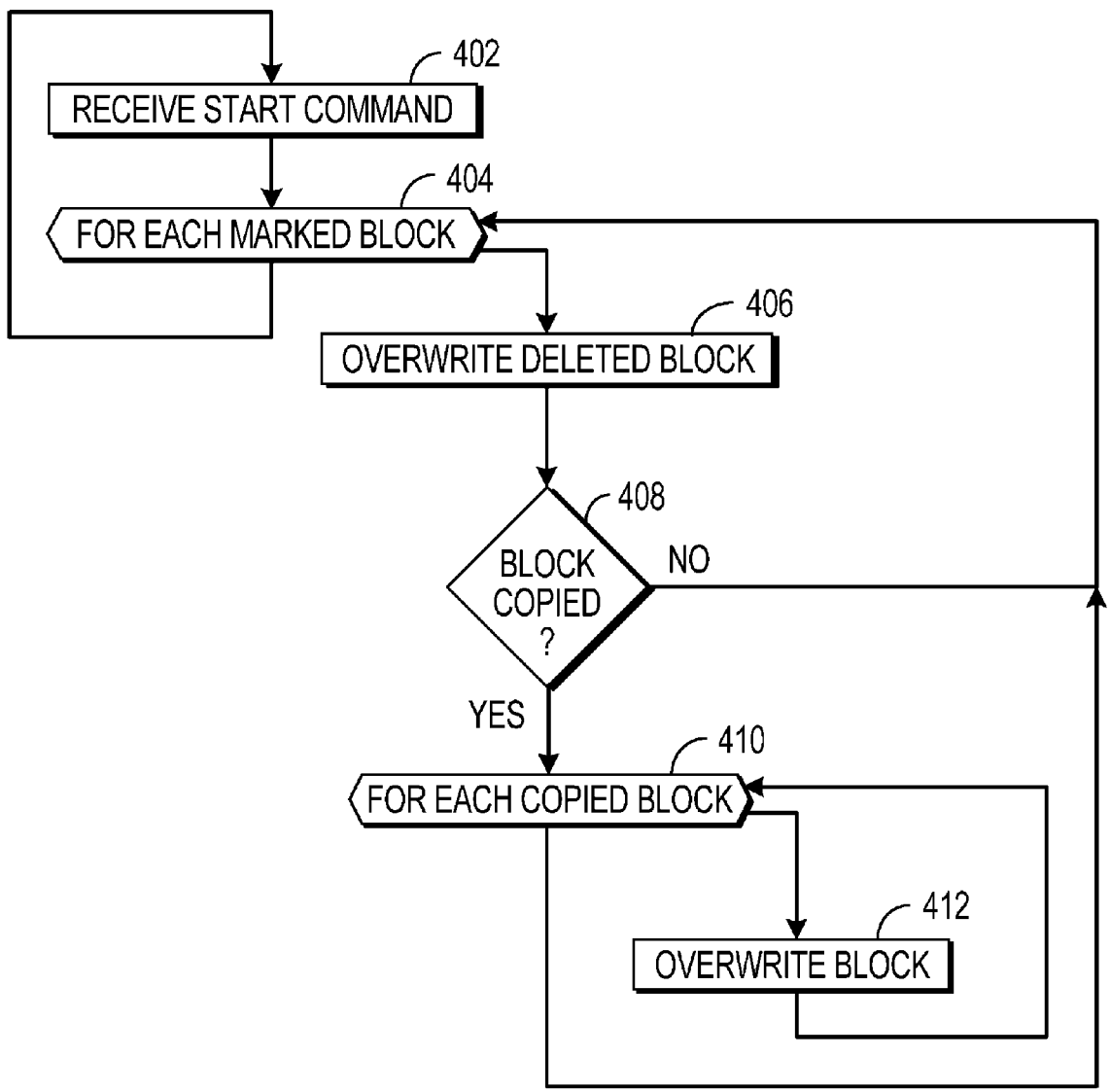
FIG. 4 is a flowchart illustration of an embodiment showing a method for a background deletion process.

FIG. 4 is a flowchart illustration of an embodiment 400 showing a method for a background deletion process. Embodiment 400 is a simplified example of a method that may be performed by a background process for identifying duplicated blocks of data and overwriting those blocks of data.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 may be performed by a background process after a delete command is processed by a storage manager. The background process may be similar to the background process 174 of embodiment 100.

A start command may be received in block 402.

Each marked block may be processed in block 404. In block 310 of embodiment 300, a storage manager may have marked one or more blocks for deletion.

The deleted block may be overwritten in block 406. When overwriting a block, the block may have all zeros or all ones stored in it or any other sequence or patterns. Such an operation may obliterate and permanently erase the contents of the block.

If the block is not a copied block in block 408, the process may return to block 404.

If the block is a copied block in block 408, for each copied block in block 410, the copied block may be overwritten in block 412.

The process of embodiment 400 may overwrite or permanently delete portions of data from physical devices in a storage array. In some embodiments, the overwriting may serve to ensure that the data on the storage array may not be accessed in the future. In such embodiments, the overwriting operation may be a security measure. In other embodiments, a physical storage device may have better performance, use less energy, or have some other characteristic that may be desirable when the overwriting process is performed on deleted storage blocks.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
   receiving a free space command from a file system manager, said free space command having a reference to a first virtual block, said file system manager configured to:
      manage a thin provisioned virtual storage volume, said thin provisioned virtual storage volume having a larger addressable space than physical storage space; and
      receive and respond to file system commands performed against said virtual storage volume;
   identifying a first physical block on a first physical storage device, said first physical block corresponding to said first virtual block; and
   freeing said first physical block.

2. The method of claim 1, said file system manager configured to manage a plurality of thin provisioned virtual storage volumes.

3. The method of claim 1 further comprising:
   identifying a second physical block on a second physical storage device, said second physical block corresponding to said first virtual block; and
   freeing said second physical block.

4. The method of claim 3, said second physical block being a duplicate of said first physical block.

5. The method of claim 4, said first physical block having a first location on said first physical device and said second physical block having a second location on said second physical device.

6. The method of claim 4, said first physical device comprising a larger number of available physical blocks than said second physical device.

7. The method of claim 1 further comprising:
   identifying a second physical block on said first physical storage device, said second physical block corresponding to said first virtual block and being a copy of said first physical block; and
   freeing said second physical block.

8. The method of claim 1, said identifying comprising looking up said first virtual block in a block management table.

9. The method of claim 8, said freeing said first physical block being performed by identifying said first physical block as free in said block management table.

10. The method of claim 8 further comprising:
    overwriting said first physical block.

11. A system comprising:
    a file management system having at least one virtual storage volume having a virtual storage size;
    a plurality of physical storage devices being a thin provisioned device having a physical storage size, said virtual storage size being larger than said physical storage size;
    a storage management system configured to manage said plurality of physical storage devices in response to said file management system and perform a method comprising:
       receiving a free space command from said file system manager, said free space command comprising an identifier for a first virtual block;
       identifying a first physical block on a first physical storage device, said first physical block corresponding to said first virtual block, said first physical storage device being a member of said plurality of physical storage devices; and
       freeing said first physical block.

12. The system of claim 11, said physical storage devices being hard disk drives.

13. The system of claim 11, at least two of said physical storage devices being different storage capacities.

14. The system of claim 11, at least two of said physical storage devices having different interface protocols.

15. The system of claim 11, said storage management system having a block management table comprising an entry for said first virtual block.

16. The system of claim 11, said method further comprising:
    identifying a second physical block on a second physical storage device, said second physical block being a duplicate of said first physical block, said second physical storage device being a member of said plurality of physical storage devices; and
    freeing said second physical block.

17. A method comprising:
    receiving a free space command from a file system manager, said free space command comprising a block identifier for a block to be freed, said file system manager configured to:
       manage a thin provisioned virtual storage volume, said thin provisioned virtual storage volume having a larger addressable space than physical storage space;
       receive and respond to file system commands performed against said virtual storage volume; and
       manage a virtual block table comprising an entry comprising said block identifier;
    identifying a first physical block on a first physical storage device by looking up said block identifier in a physical block table, said first physical block corresponding to said first virtual block; and
    freeing said first physical block.

18. The method of claim 17, said physical block table comprising identifiers for a plurality of physical storage devices.

19. The method of claim 18 further comprising:
    identifying a second physical block on a second physical storage device by looking up said block identifier in a physical block table, said second physical block corresponding to said first physical block; and
    freeing said second physical block.

20. The method of claim 19, said second physical block being a duplicate of said first physical block.

* * * * *